(12) United States Patent
Nakano et al.

(10) Patent No.: US 8,996,385 B2
(45) Date of Patent: Mar. 31, 2015

(54) CONVERSATION SYSTEM AND CONVERSATION SOFTWARE

(75) Inventors: Mikio Nakano, Wako (JP); Hiroshi Tsujino, Wako (JP); Yohane Takeuchi, Wako (JP); Kazunori Komatani, Wako (JP); Hiroshi Okuno, Kyoto (JP)

(73) Assignee: Honda Motor Co., Ltd., Tokyo (JP)

(*) Notice: Subject to any disclaimer, the term of this patent is extended or adjusted under 35 U.S.C. 154(b) by 1444 days.

(21) Appl. No.: 12/087,791

(22) PCT Filed: Jan. 31, 2007

(86) PCT No.: PCT/JP2007/051576
§ 371 (c)(1),
(2), (4) Date: Jul. 15, 2008

(87) PCT Pub. No.: WO2007/088877
PCT Pub. Date: Aug. 9, 2007

(65) Prior Publication Data
US 2008/0319748 A1    Dec. 25, 2008

(51) Int. Cl.
*G06F 17/27* (2006.01)
*G10L 21/00* (2013.01)
*G10L 25/00* (2013.01)
*G10L 15/22* (2006.01)
*G10L 15/18* (2013.01)

(52) U.S. Cl.
CPC ............. *G10L 15/22* (2013.01); *G10L 15/1822* (2013.01)
USPC ............. 704/275; 704/270.1; 704/270; 704/9

(58) Field of Classification Search
CPC ....... G10L 15/22; G10L 15/19; G10L 15/265; G06F 17/2785
USPC .................................................. 704/270, 275
See application file for complete search history.

(56) References Cited

U.S. PATENT DOCUMENTS

| | | | |
|---|---|---|---|
| 6,311,150 B1 * | 10/2001 | Ramaswamy et al. | 704/1 |
| 7,092,928 B1 * | 8/2006 | Elad et al. | 706/60 |
| 7,225,183 B2 * | 5/2007 | Gardner | 1/1 |
| 7,257,537 B2 * | 8/2007 | Ross et al. | 704/270 |
| 7,398,209 B2 * | 7/2008 | Kennewick et al. | 704/255 |
| 7,640,160 B2 * | 12/2009 | Di Cristo et al. | 704/257 |
| 7,716,056 B2 * | 5/2010 | Weng et al. | 704/275 |
| 7,739,218 B2 * | 6/2010 | Arguello et al. | 706/61 |
| 7,869,998 B1 * | 1/2011 | Di Fabbrizio et al. | 704/251 |
| 7,904,297 B2 * | 3/2011 | Mirkovic et al. | 704/257 |
| 2001/0041980 A1 * | 11/2001 | Howard et al. | 704/270 |

(Continued)

OTHER PUBLICATIONS

Ramaswamy, Ganesh N. / Kleindienst, Jan (2000): "Hierarchical feature-based translation for scalable natural language understanding", in ICSLP-2000, vol. 3, 506-509.*

(Continued)

*Primary Examiner* — Matthew Baker
(74) *Attorney, Agent, or Firm* — Birch, Stewart, Kolasch & Birch, LLP (57) ABSTRACT

A first domain satisfying a first condition concerning a current utterance understanding result and a second domain satisfying a second condition concerning a selection history are specified. For each of the first and second domains, indices representing reliability in consideration of the utterance understanding history, selection history, and utterance generation history are evaluated. Based on the evaluation results, one of the first, second, and third domains is selected as a current domain according to a selection rule.

10 Claims, 4 Drawing Sheets

(56) References Cited

U.S. PATENT DOCUMENTS

| | | | |
|---|---|---|---|
| 2002/0038213 A1* | 3/2002 | Adachi | 704/257 |
| 2002/0133355 A1* | 9/2002 | Ross et al. | 704/275 |
| 2004/0039636 A1* | 2/2004 | Feldes et al. | 705/14 |
| 2004/0044516 A1* | 3/2004 | Kennewick et al. | 704/5 |
| 2004/0153317 A1* | 8/2004 | Chamberlain | 704/219 |
| 2006/0074670 A1* | 4/2006 | Weng et al. | 704/257 |
| 2006/0074671 A1* | 4/2006 | Farmaner et al. | 704/257 |
| 2006/0080107 A1* | 4/2006 | Hill et al. | 704/275 |
| 2006/0271364 A1* | 11/2006 | Mirkovic et al. | 704/239 |
| 2007/0011154 A1* | 1/2007 | Musgrove et al. | 707/5 |
| 2007/0033005 A1* | 2/2007 | Cristo et al. | 704/9 |
| 2007/0050191 A1* | 3/2007 | Weider et al. | 704/275 |
| 2007/0299659 A1* | 12/2007 | Chamberlain | 704/219 |
| 2008/0015864 A1* | 1/2008 | Ross et al. | 704/275 |
| 2008/0097748 A1* | 4/2008 | Haley et al. | 704/9 |
| 2008/0319750 A1* | 12/2008 | Potter et al. | 704/255 |
| 2009/0063147 A1* | 3/2009 | Roy | 704/251 |

OTHER PUBLICATIONS

Pakucs, Botond (2003): "Towards dynamic multi-domain dialogue processing", In EUROSPEECH-2003, 741-744.*

Naoyuki Kanda et al., Information Processing Society of Japan Kenkyu Hokoku, Feb. 3, 2006, vol. 2006, No. 12, pp. 55 to 60.

Noboru Miyazaki et al., The Acoustical Society of Japan (ASJ) 2005 Nen Shuki Kenkyu Happyokai Koen Ronbunshu CD-ROM, Sep. 20, 2005, pp. 189-190.

Yukiko Suzuki et al., Dai 40 Kai Gengo. Onsei Rikai to Taiwa Shori Kenkyukai Shiryo, Mar. 5, 2004, pp. 73 to 78.

Shin'ichi Ueno et al., Dai 40 Kai Gengo. Onsei Rikai to Taiwa Shori Kenkyukai Shiryo, Mar. 5, 2004, pp. 65 to 72.

Toshihiro Isobe et al., Information Processing Society of Japan Kenkyu Hokoku, Jul. 18, 2003, vol. 2003, No. 75, pp. 41 to 46.

Norihito Yasuda et al., Information Processing Society of Japan Kenkyu Hokoku, Feb. 7, 2003, vol. 2003, No. 14, pp. 119 to 124.

Makoto Nagamori et al., Information Processing Society of Japan Kenkyu Hokoku, Jun. 2, 2000, vol. 2000, No. 54, pp. 45 to 51.

Nobuo Kawaguchi et al., Information Processing Society of Japan, Jun. 1, 2001, vol. 2001, No. 55, pp. 1 to 8.

Ian O'Neill et al., International Speech Communication Association, 2004.

* cited by examiner

CONVERSATION SYSTEM AND CONVERSATION SOFTWARE

TECHNICAL FIELD

The present invention primarily relates to a conversation system which understands an utterance input from a user and generates an utterance output to the user.

BACKGROUND ART

For improvement in usability of car navigators and the like, various systems or interfaces enabling conversation with the user by speech have been proposed. A speech conversation system retrieves necessary information from a database storing information of a specific domain, such as route guidance, traffic information, weather information or the like, to provide it to the user. Further, a speech conversation system provided with a plurality of databases storing information of a plurality of domains, respectively, is also provided, to enable variable conversations with the user. In such a speech conversation system intended for conversations over a plurality of domains, it is necessary to select an appropriate domain in consideration of the content of the user's utterance. Various techniques for selecting a domain have conventionally been proposed, as in the following publications.

1. Makoto Nagamori et al., "A Framework for Multi-Domain Conversational Systems", Information Processing Society of Japan, Report No. 2000-SLP-31-7, 2000
2. Nobuo Kawaguchi et al., "Design and Evaluation of A Unified Management Architecture for Multi-Domain Spoken Dialogue", Information Processing Society of Japan, Report No. 2001-SLP-36-10, 2001
3. I. O'Neill et al., "Cross Domain Dialogue Modeling: An Object-Based Approach", In Proc. ICSLP, Vol. I, 2004

According to the conventional techniques, however, there exist limitations such that transition of domains is permitted only after a task is accomplished, or even if the transition is permitted, it is only from the currently selected domain to the one similar to that domain. This causes an inappropriate domain in consideration of the content of the user's utterance to be selected a plurality of number of times, resulting in excessive elongation of the state with a gap in conversation between the user and the system.

In view of the foregoing, an object of the present invention is to provide a system which can advance a conversation with a user with improved capability of following the content of the user's utterance, and software which causes a computer to function as the conversation system.

DISCLOSURE OF THE INVENTION

A conversation system according to a first invention to achieve the above-described object includes a first processing unit which understands an utterance input to a speech input device, a second processing unit which selects one of a plurality of domains based on the utterance understanding result by the first processing unit, and a third processing unit which generates an utterance to be output from a speech output device based on the domain selected by the second processing unit, wherein the second processing unit specifies a first domain satisfying a first condition concerning a current utterance understanding result by the first processing unit and a second domain satisfying a second condition concerning a selection history by the second processing unit from among the plurality of domains, evaluates a part or all of first, second, and third indices for each of the first and second domains, the first index representing reliability in consideration of an utterance understanding history by the first processing unit, the second index representing reliability in consideration of the selection history by the second processing unit, and the third index representing reliability in consideration of an utterance generation history by the third processing unit, and the second processing unit selects one of the first domain, the second domain, and a third domain different from the first and second domains, as a current domain, based on the evaluation results and according to a selection rule.

According to the conversation system of the first invention, among a plurality of domains, at least one "first domain" satisfying the "first condition" concerning the current utterance understanding result is included in the choices for the current domain. This allows the domain with high reliability as a domain for use in conversation in consideration of the current utterance understanding result to be selected as the current domain.

Further, of the plurality of domains, at least one "second domain" satisfying the "second condition" concerning the selection history is included in the choices for the current domain. This ensures that the domain having high reliability as the domain for use in conversation in consideration of the selection history is selected as the current domain.

Furthermore, the current domain is selected based on the evaluation results of a part or all of the first, second, and third indices for each of the first and second domains. This enables the domain having high reliability as the domain for use in conversation, in consideration of a part or all of utterance understanding history, selection history, and utterance generation history, to be selected as the current domain.

Further, at least one "third domain" is included in the choices for the current domain, besides the first and second domains. Thus, in the case where the first and second domains are both inappropriate as the current domain in consideration of the evaluation results of a part or all of the first, second, and third indices, the third domain, rather than the first or second domain, may be selected as the current domain.

Accordingly, it is possible to advance the conversation with the user, with improved capability of following the content of the user's utterance.

A conversation system according to a second invention is characterized in that, in the conversation system of the first invention, the second processing unit evaluates likelihood of each domain based on the utterance understanding result by the first processing unit, and specifies the domain satisfying the first condition that the likelihood of the domain is ranked within $n_1$ ($n_1=1, 2, \ldots$), as the first domain.

Further, a conversation system according to a third invention is characterized in that, in the conversation system of the first invention, upon selection of a domain at the k+1-th time (k=1, 2, ...), the second processing unit specifies the domain satisfying the second condition that the domain was selected as the current domain up to i times before (i=1, 2, ...), as the second domain.

Further, a conversation system according to a fourth invention is characterized in that, in the conversation system of the first invention, upon selection of a domain at the k+1-th time (k=1, 2, ...), the second processing unit specifies the domain satisfying the second condition that the accumulated number of times that the domain was selected as the current domain is ranked within $n_2$ ($n_2=1, 2, \ldots$) among the domains that were selected as the current domain up to i times before, as the second domain.

Further, a conversation system according to a fifth invention is characterized in that, in the conversation system of the first invention, the second processing unit evaluates the first index for each of the first and second domains, based on at least one of: an index representing presence/absence of a positive response; an index representing presence/absence of a negative response; the number of times of slot updating; the accumulated number of positive responses; the accumulated number of negative responses; the accumulated number of times of slot updating; the number of times of utterance understanding; an acoustic score of the utterance understanding result; posterior probability of the utterance understanding result; and an arithmetic mean of language component reliability in the utterance understanding result.

Further, a conversation system according to a sixth invention is characterized in that, in the conversation system of the first invention, the second processing unit evaluates the second index for each of the first and second domains, based on at least one of an index representing presence/absence of selection and the number of times of selection.

Further, a conversation system according to a seventh invention is characterized in that, in the conversation system of the first invention, the second processing unit evaluates the third index for each of the first and second domains, based on at least one of an index representing presence/absence of task accomplishment and the accumulated number of times of task accomplishment.

Further, a conversation system according to an eighth invention is characterized in that, in the conversation system of the first invention, the second processing unit selects a current domain according to a decision tree serving as the selection rule.

A conversation program according to a ninth invention to achieve the above-described object causes a computer to function as a conversation system including a first processing unit which understands an utterance input to a speech input device, a second processing unit which selects one of a plurality of domains based on the utterance understanding result by the first processing unit, and a third processing unit which generates an utterance to be output from a speech output device based on the domain selected by the second processing unit, wherein the program causes the computer to function such that the second processing unit specifies a first domain satisfying a first condition concerning a current utterance understanding result by the first processing unit and a second domain satisfying a second condition concerning a selection history by the second processing unit from among the plurality of domains, evaluates a part or all of first, second, and third indices for each of the first and second domains, the first index representing reliability in consideration of an utterance understanding history by the first processing unit, the second index representing reliability in consideration of the selection history by the second processing unit, and the third index representing reliability in consideration of an utterance generation history by the third processing unit, and the second processing unit selects one of the first domain, the second domain, and a third domain different from the first and second domains, as a current domain, based on the evaluation results and according to a selection rule.

According to the conversation program of the ninth invention, it is possible to cause the computer to function as the conversation system capable of advancing the conversation with the user with improved capability of following the content of the user's utterance. Here, causing the computer to function as the conversation system refers to the configuration where, with the conversation program stored in a storage device such as a ROM of the computer, a processing device such as a CPU of the computer is caused to read the conversation program from the storage device and carry out processing such as domain selection as described above in accordance with the conversation program.

BEST MODE FOR CARRYING OUT THE INVENTION

Embodiments of the conversation system and conversation software of the present invention will now be described with reference to the drawings.

Figure 1:
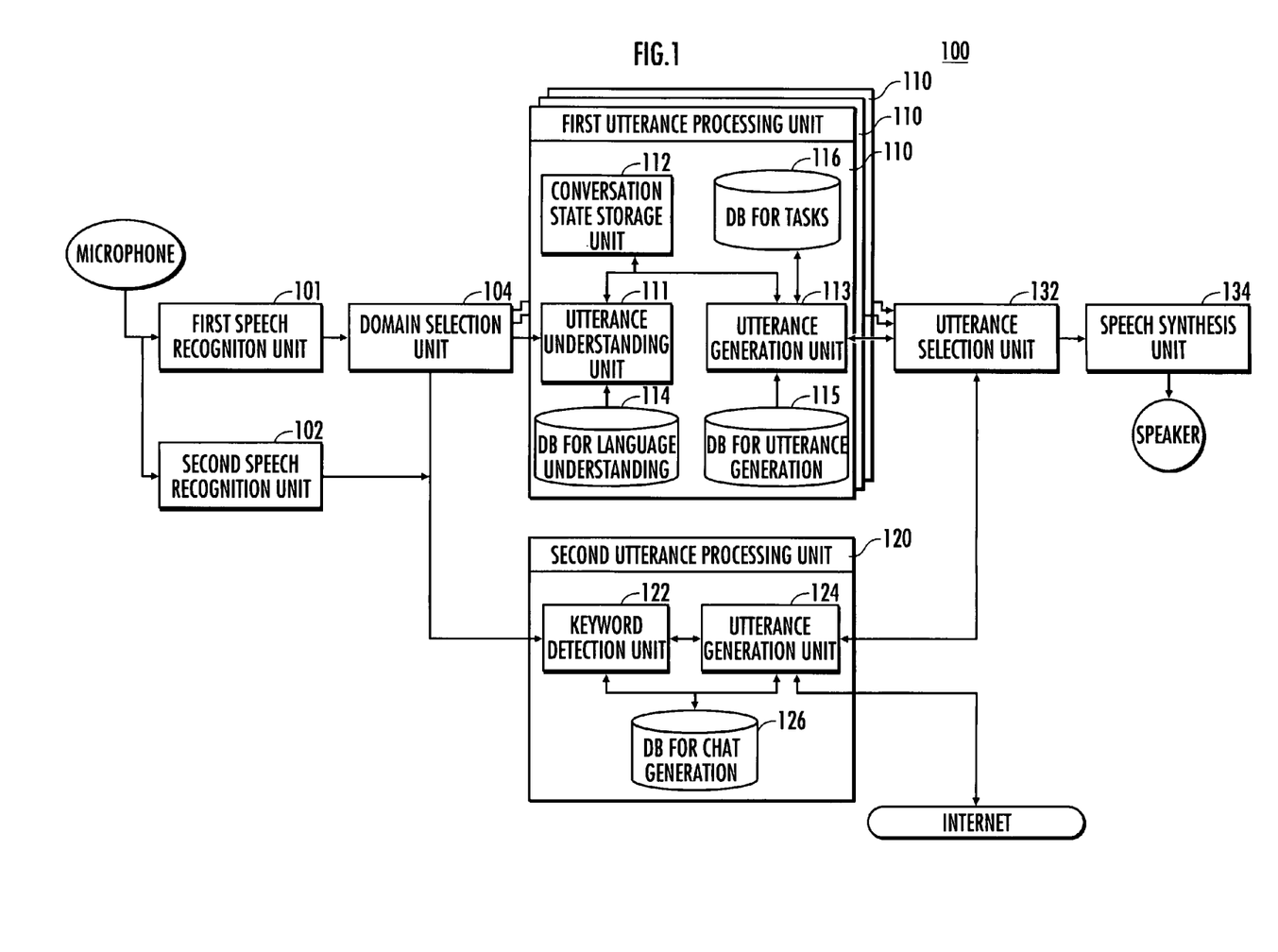
FIG. 1 is an illustrative configuration diagram of a conversation system.

A conversation system 100 shown in FIG. 1 is composed of a computer serving as hardware which is installed in a navigation system mounted on an automobile, for example, and a "conversation program" serving as software which is stored in a memory of the computer. While the conversation program may be prestored in the memory, it may also be installed to the computer via a storage medium such as a CD-ROM, or may be distributed or broadcast toward the computer via a network and then stored in the memory.

The conversation system 100 includes a first speech recognition unit 101, a second speech recognition unit 102, a domain selection unit (second processing unit) 104, a plurality of first utterance processing units 110, a second utterance processing unit 120, an utterance selection unit 132, and a speech synthesis unit 134. It is noted that the conversation system 100 does not necessarily have to include the second speech recognition unit 102 and the second utterance processing unit 120.

The first speech recognition unit 101 recognizes a speech uttered by the user based on the speech input to a microphone (speech input device), according to a known technique such as the hidden Markov model and using a small glossary DB. The second speech recognition unit 102 recognizes the speech uttered by the user based on the speech input to the microphone, according to the known technique such as the hidden Markov model and using a large glossary DB. The domain selection unit 104 selects one of a plurality of domains.

The first utterance processing unit 110 includes an utterance understanding unit (first processing unit) 111, a conversation state storage unit 112, an utterance generation unit (third processing unit) 113, a DB (database) 114 for language understanding, a DB 115 for utterance generation, and a DB 116 for tasks. The plurality of first utterance processing units 110 correspond respectively to different domains such as "restaurant domain", "hotel domain", and others.

The utterance understanding unit 111 recognizes the content of the utterance, based on the first speech recognition result by the first speech recognition unit 101, and using the knowledge for language understanding which is stored in the DB 114 for language understanding. The conversation state storage unit 112 stores a result of utterance understanding by the utterance understanding unit 111 and others. The utterance generation unit 113 generates an utterance text using the utterance understanding result stored in the conversation state storage unit 112, knowledge for utterance generation stored in the DB 115 for utterance generation, and also using a text stored in the DB 116 for tasks. The DB 114 for language understanding stores the "knowledge for language understanding" which is necessary for understanding language components. Each of the DBs 114, 115, and 116 stores the knowledge specific to the domain corresponding to the first utterance processing unit.

The second utterance processing unit 120 includes a keyword detection unit 122, an utterance generation unit 124, and a DB 126 for chat generation. The second utterance processing unit 120 corresponds to a "chat domain".

The keyword detection unit 122 detects a keyword, based on the second speech recognition result by the second speech recognition unit 102, and according to the knowledge for chat generation which is stored in the DB 126 for chat generation. The utterance generation unit 124 generates an utterance text for chat, using the keyword detected by the keyword detection unit 122 and also using the knowledge for chat generation stored in the DB 126 for chat generation. The DB 126 for chat generation stores the "knowledge for chat generation" which is necessary for generating texts for chat.

The utterance selection unit 132 confirms the content of the utterance generated by the utterance generation unit 113 in the first utterance processing unit 110 or the utterance generated by the utterance generation unit 124 in the second utterance processing unit 120. The speech synthesis unit 134 uses the content of the utterance confirmed by the utterance selection unit 132 to synthesize it as speech, and causes the utterance as the synthesized speech to be output to a speaker (speech output device).

The functions of the conversation system 100 having the above configuration will now be described with reference to FIGS. 2 to 4.

Figure 2:
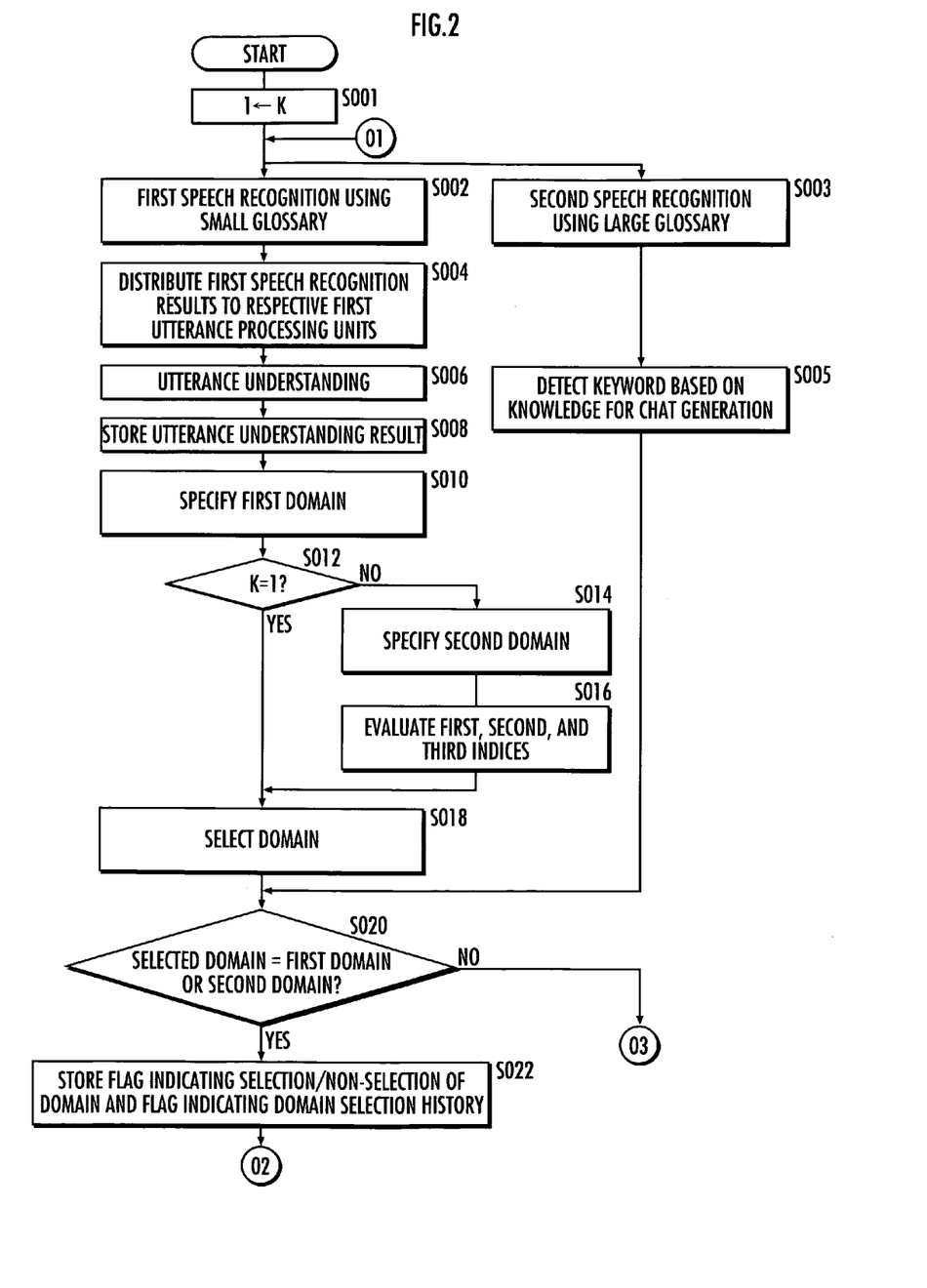
FIG. 2 is an illustrative functional diagram of the conversation system.

Firstly, at the time for example when the ignition switch of the automobile on which the conversation system 100 is mounted is switched from OFF to ON and, hence, the conversation system 100 is switched from OFF to ON as well, an index k representing the accumulated number of user's utterances is set to "1" (S001 in FIG. 2).

When a user such as a driver speaks, the utterance is input to the microphone. The first speech recognition unit 101 uses the output signal from the microphone corresponding to the input utterance, to recognize candidates for language components (words, for example) contained in the input utterance, using a "small glossary" stored in the small glossary DB (S002 in FIG. 2). For example, in the case where the input utterance includes a first language component $W_1(k)$ and a second language component $W_2(k)$, the first speech recognition unit 101 recognizes a set (hereinafter, referred to as a "first set") $G_1(k)$ of $N_1$ first language component candidates $E_{1i}(k)$ (i=1, 2, . . . , $N_1$) each having a high likelihood of being the first language component $W_1(k)$ and a set (hereinafter, referred to as a "second set") $G_2(k)$ of $N_2$ second language component candidates $E_{2j}(k)$ (j=1, 2, . . . , $N_2$) each having a high likelihood of being the second language component $W_2(k)$. It is noted that the number $N_1$ of language components contained in the first set $G_1(k)$ may be the same as or different from the number $N_2$ of language components contained in the second set $G_2(k)$.

The first speech recognition unit 101 outputs the first set $G_1(k)$ and the second set $G_2(k)$ as the first speech recognition results to the domain selection unit 104, and the domain selection unit 104 in turn distributes and outputs the first speech recognition results to the plurality of first utterance processing units 110 (S004 in FIG. 2).

Further, the second speech recognition unit 102 uses the output signal from the microphone corresponding to the input utterance to recognize the candidates for the language components contained in the input utterance, using a "large glossary" stored in the large glossary DB (S003 in FIG. 2). The "large glossary" used by the second speech recognition unit 102 has the greater number of language components registered therein than in the "small glossary" used by the first speech recognition unit 101. This allows the second speech recognition unit 102 to recognize the language components that cannot be recognized by the first speech recognition unit 101, although the second speech recognition unit 102 is somewhat inferior in speech recognition accuracy to the first speech recognition unit 101.

Further, the second speech recognition unit 102 outputs the second speech recognition results to the keyword detection unit 122 of the second utterance processing unit 120, and the keyword detection unit 122 in turn detects a keyword, based on the second speech recognition results, and using the "knowledge for chat generation" stored in the DB 126 for chat generation (S005 in FIG. 2).

In each of the plurality of first utterance processing units 110, the utterance understanding unit 111 recognizes the input utterance, based on the first speech recognition results, and using the knowledge for language understanding (S006 in FIG. 2). Specifically, the utterance understanding unit 111 retrieves, from the first set $G_1(k)$, the first language component candidate $E_{1i}(k)$ corresponding to one of a plurality of first dictionary language components stored as a part of the "knowledge for language understanding" in the DB 114 for language understanding, with a higher priority given to the one having a higher likelihood. Further, the utterance understanding unit 111 retrieves, from the second set $G_2(k)$, the second language component candidate $E_{2j}(k)$ corresponding to one of a plurality of second dictionary language components stored as a part of the "knowledge for language understanding" in the DB 114 for language understanding, with a higher priority given to the one having a higher likelihood.

For example, assume that in the first utterance processing unit 110 corresponding to the "meal domain", the DB 114 for language understanding stores a sentence: "tell me <information category> of <name of restaurant>" as the knowledge for language understanding, a plurality of names of restaurants as the plurality of first dictionary language components, and a plurality of information categories, including addresses, contact numbers, routes, and related information items, as the plurality of second dictionary language components. In this case, the utterance understanding unit 111 retrieves the first language component candidate $E_{11}(k)$ (for example, "Bistro OO") with the highest likelihood in the first set $G_1(k)$, which corresponds to one of the plurality of names of restaurants, and also retrieves the second language component candidate $E_{21}(k)$ (for example, "address") with the highest likelihood in the second set $G_2(k)$, which corresponds to one of the plurality of information categories.

Further, assume that in the first utterance processing unit 110 corresponding to the "accommodation domain", the DB 114 for language understanding stores a sentence: "tell me <information category> of <name of accommodation facility>" as the knowledge for language understanding, a plurality of names of accommodation facilities as the plurality of first dictionary language components, and a plurality of information categories, including addresses, contact numbers, and related information items, as the plurality of second dictionary language components. In this case, the utterance understanding unit 111 retrieves the first language component candidate $E_{13}(k)$ (for example, "Hotel 00") with the third-ranked likelihood in the first set $G_1(k)$, which corresponds to one of the plurality of names of accommodation facilities and also retrieves the second language component candidate $E_{21}(k)$ (for example, "address") with the highest likelihood in the second set $G_2(k)$, which corresponds to one of the plurality of information categories.

Further, the utterance understanding results by the utterance understanding unit 111 are stored in the conversation state storage unit 112 (S008 in FIG. 2). Specifically, the first language component candidate $E_{1i}(k)$ retrieved from the first set $G_1(k)$ is stored in a "first slot" in the conversation state storage unit 112, and the second language component candidate $E_{2j}(k)$ retrieved from the second set $G_2(k)$ is stored in a "second slot" in the conversation state storage unit 112. For example, for the meal domain described above, the <name of restaurant> and the <information category> included in the sentence "tell me <information category> of <name of restaurant>" correspond to the first and second slots, respectively. For the accommodation domain described above, the <name of accommodation facility> and the <information category> included in the sentence "tell me <information category> of <name of accommodation facility>" correspond to the first and second slots, respectively. It is noted that in the domain having no first language component candidate stored in the first slot, the second language component candidate $E_{2j}(k)$ does not necessarily have to be stored in the second slot. In the case where the first speech recognition result corresponds to a positive response such as "yes", "right" or the like, or in the case where the first speech recognition result corresponds to a negative response such as "no", "wrong" or the like, flags indicating the presence of the positive or negative response and the number of such responses are stored in the conversation state storage unit 112 of the first utterance processing unit 110 corresponding to the previously selected domain.

Further, the stored state of the language component candidate in each slot is also stored as the conversation state in the conversation state storage unit 112. In this manner, for example for the meal domain, the state where the first language component candidate $E_{11}(k)$ and the second language component candidate $E_{21}(k)$ are stored in the first and second slots, respectively, is stored as the conversation state in the conversation state storage unit 112. Further, for the accommodation domain, the state where the first language component candidate $E_{13}(k)$ and the second language component candidate $E_{21}(k)$ are stored in the first and second slots, respectively, is stored as the conversation state in the conversation state storage unit 112. Further, for another domain, the state where no first language component candidate is stored in the first slot is stored as the conversation state in the conversation state storage unit. The "conversation state" may include an index k representing the accumulated number of user's utterances.

Subsequently, in each first utterance processing unit 110, the utterance understanding unit 111 reads and outputs the conversation state stored in the conversation state storage unit 112 to the domain selection unit 104. The domain selection unit 104 then specifies at least one domain satisfying a "first condition" concerning an utterance understanding result from among a plurality of domains, as the "first domain" (S010 in FIG. 2). The "first condition" may be that the likelihood of the domain, evaluated based on the utterance understanding result, is ranked within $n_1$ ($n_1$=1, 2, ... ).

Assume by way of example that the "first condition" is that "the likelihood of the first language component candidate $E_{1i}(k)$ stored in the first slot (which corresponds to the likelihood of the domain) is the highest among the plurality of domains", and that the first language component candidate $E_{11}(k)$ is stored in the first slot for the meal domain and the first language component candidate $E_{13}(k)$ is stored in the first slot for the accommodation domain. In this case, of the two domains, the meal domain having the first language component candidate $E_{11}(k)$ with the highest likelihood stored in the first slot is specified as the "first domain".

Further, the domain selection unit 104 determines whether the index k representing the accumulated number of user's utterances is "1" (S012 in FIG. 2).

If it is determined that the index k is "1" (YES in S012 in FIG. 2), the domain selection unit 104 selects the first domain as the current domain (S018 in FIG. 2). It is noted that in the case where a plurality of first domains has been specified, a part or all of the first, second, and third indices, as will be described later, may be evaluated for each of the plurality of first domains, to select one of the first domains based on the evaluation results.

On the other hand, if it is determined that the index k is not "1" (NO in 5012 in FIG. 2), the domain selection unit 104 specifies at least one domain satisfying a "second condition" concerning a selection history from among a plurality of domains, as a "second domain" (S014 in FIG. 2). The "second condition" may be that the domain was selected as the current domain up to i times before (i=1, 2, ... ), or that the accumulated number of times that the domain was selected as the current domain is ranked within $n_2$ ($n_2$=1, 2, ... ) among the domains selected as the current domain up to i times before.

Assume by way of example that the "second condition" is that "it is the domain selected last time" and that the meal domain was selected as the domain last time from among a plurality of domains. In this case, the meal domain is specified as the "second domain".

In the case where the second domain is specified in addition to the first domain, a part or all of the "first index", the "second index", and the "third index" are evaluated for each of the first and second domains (S016 in FIG. 2). In each of the first utterance processing units 110 corresponding to the first and second domains, respectively, the indices are evaluated based, e.g., on various flags indicating the conversation states, which are stored in the conversation state storage unit 112.

The "first index" represents reliability in consideration of the utterance understanding history by the utterance understanding unit (first processing unit) 111. The "first index" may be: (1) an index representing presence/absence of a positive response; (2) an index representing presence/absence of a negative response; (3) the number of times of slot updating; (4) the accumulated number of positive responses; (5) the accumulated number of negative responses; (6) the accumulated number of times of slot updating; (7) the number of times of utterance understanding; (8) an acoustic score of the utterance understanding result; (9) posterior probability of the utterance understanding result; or (10) an arithmetic mean of language component reliability in the utterance understanding result; or may be a function having at least one of the foregoing as a variable. The "acoustic score" is an index representing similarity between the signal output from the microphone and the acoustic model prepared for each phoneme. The "language component reliability" is an index representing reliability of each domain from the standpoint of how much the best acoustic score differs from the other acoustic scores for the acoustic scores of a plurality of language component candidates. For example, while the reliability is evaluated as high in the case where the best acoustic score is considerably higher than the other acoustic scores, the reliability is evaluated as low in the case where the best acoustic score is not so higher than the other ones.

The "second index" represents reliability in consideration of a selection history by the domain selection unit (second processing unit) 104. The "second index" may be (1) an index representing presence/absence of selection or (2) the number of times of selection, or may be a function having at least one of them as a variable.

The "third index" represents reliability in consideration of an utterance generation history by the utterance generation unit (third processing unit) 113. The "third index" may be (1) an index representing presence/absence of task accomplishment or (2) the accumulated number of times of task accomplishment, or may be a function having at least one of them as a variable. The "task accomplishment" means that the utterance generation unit 113 has read a text from the DB 116 for tasks and generated an utterance using the read text, as will be described later.

Subsequently, the domain selection unit 104 selects one domain from among the first and second domains as well as the third domain, according to a prescribed selection rule, based on the evaluation results of a part or all of the first, second and third indices (S018 in FIG. 2). As the selection rule, a decision tree as shown in FIG. 4 may be adopted. While only a part of the decision tree is shown in FIG. 4, the rest part may be set as appropriate in consideration of the properties of the first, second and third indices. As the selection rule, various selection rules may be adopted besides the decision tree, such as a fuzzy rule using a part or all of the first, second, and third indices. As the "third domain", a "chat domain" corresponding to the second utterance processing unit 120, for example, is specified. Alternatively, a domain corresponding to the first utterance processing unit 110 may be specified as the "third domain".

The domain selection unit 104 determines whether the selected domain is the first or second domain (S020 in FIG. 2).

If the domain selection unit 104 determines that the selected domain is the first or second domain (YES in S020 in FIG. 2), it places a flag "1" indicating that the domain has been selected and a flag indicating the number of times that the domain was selected, in the conversation state storage unit 112 of the first utterance processing unit 110 corresponding to the selected domain (S022 in FIG. 2). Further, the domain selection unit 104 places a flag "0" indicating that the domain was not selected, in the conversation state storage unit 112 of the first utterance processing unit 110 which corresponds to the unselected domain (S022 in FIG. 2). In the first utterance processing unit 110 corresponding to the unselected domain, all the slots in the conversation state storage unit 112 are reset to the non-stored state.

Subsequently, the utterance selection unit 132 inquires of the first utterance processing unit 110 corresponding to the selected domain about an output utterance. In response, the utterance generation unit 113 of the first utterance processing unit 110 reads the conversation state (specifying the stored state in each slot and the like) from the conversation state storage unit 112, reads the knowledge for utterance generation from the DB 115 for utterance generation, and compares the conversation state with the knowledge for utterance generation (S024 in FIG. 3). The utterance generation unit 113 determines whether it is necessary to retrieve a text (or language component) from the DB 116 for tasks, based on the comparison result (S026 in FIG. 3). For example, if all the slots are in the stored state (with the first language component candidate $E_{1i}(k)$ stored in the first slot and the second language component candidate $E_{2j}(k)$ stored in the second slot), it is specified by the knowledge for utterance generation that it is necessary to retrieve the text associated with the stored language component candidates (which text is represented by the function $f(k)=f(E_{1i}(k), E_{2j}(k))$ of the two language component candidates) from the DB 116 for tasks, while if a part or all of the slots are in the non-stored state, it is specified by the knowledge for utterance generation that it is unnecessary to retrieve a text from the DB 116 for tasks.

Figure 3:
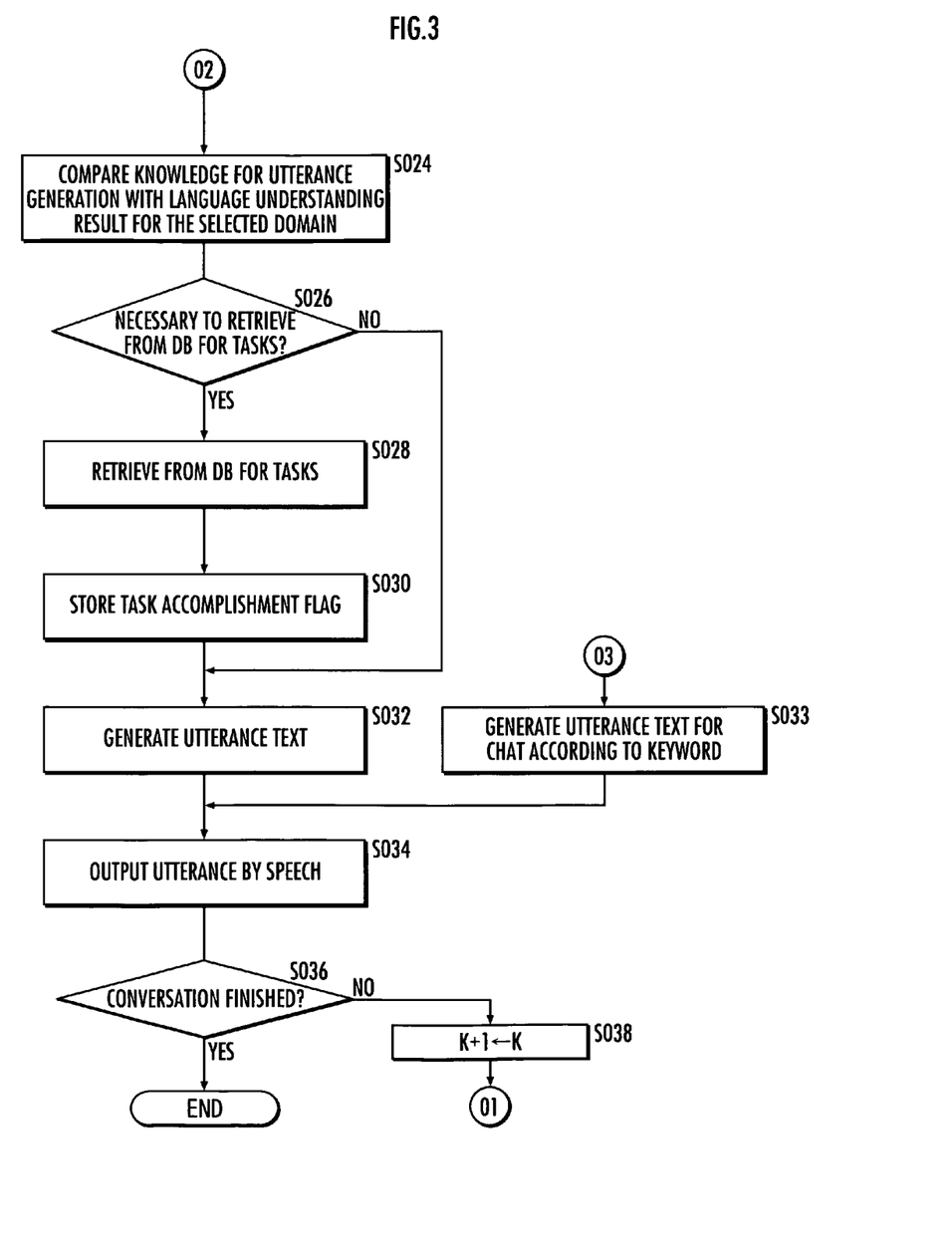
FIG. 3 is another functional diagram of the conversation system.
Figure 4:
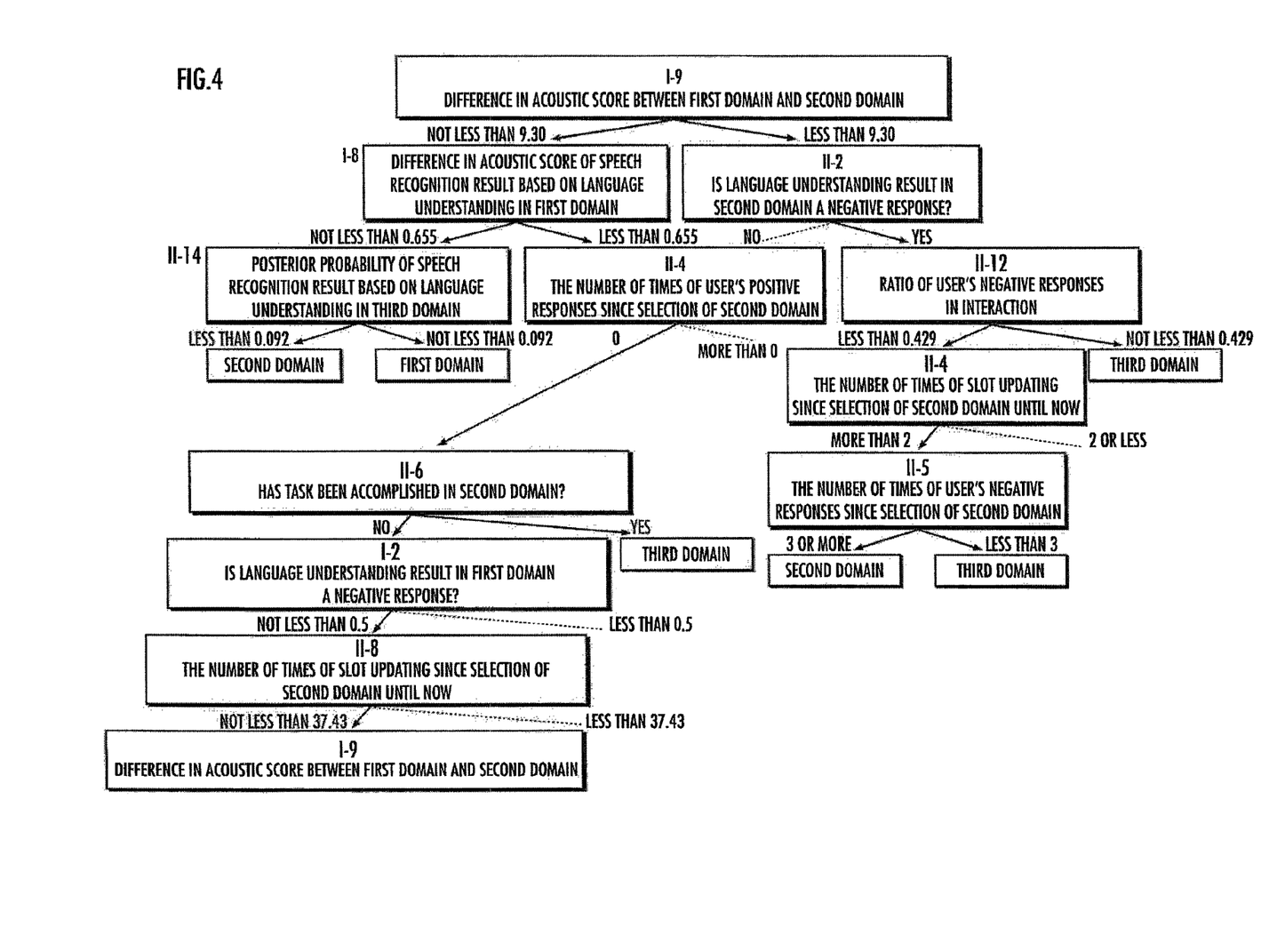
FIG. 4 is an illustrative diagram of a decision tree for use in domain selection.

If the utterance generation unit 113 determines that text retrieval is necessary (YES in S026 in FIG. 3), it retrieves the text from the DB 116 for tasks (S028 in FIG. 3). For example, in the case where the meal domain is selected and the first language component candidate $E_{11}(k)$="Bistro OO" and the second language component candidate $E_{21}(k)$="address" are stored in the respective slots in the first utterance processing unit 110 as described above, the utterance generation unit 113 retrieves the text $f(k)=f(E_{11}(k), E_{21}(k))$="XX-ku, Kyoto-city, Kyoto-prefecture" from the DB 116 for tasks. In response to the text retrieval, the utterance generation unit 113 places a task accomplishment flag (indicating the fact that the task has been accomplished and the number of times of task accomplishment) in the conversation state storage unit 112 (S030 in FIG. 3).

Further, the utterance generation unit 113 generates an utterance text using the retrieved text and the knowledge for utterance generation (S032 in FIG. 3). For example, in the case where the first language component candidate $E_{1i}(k)$="Bistro OO" is stored in the first slot and the second language component candidate $E_{2j}(k)$="address" is stored in the second slot in the first utterance processing unit 110 corresponding to the meal domain, the retrieved text $f(k)$="XX-ku, Kyoto-city, Kyoto-prefecture" is used to generate the utterance text "The address of Bistro OO is XX-ku, Kyoto-city, Kyoto-prefecture".

On the other hand, if the utterance generation unit 113 determines that it is unnecessary to retrieve a text from the DB 116 for tasks (NO in S026 in FIG. 3), it generates an utterance text using the knowledge for utterance generation, without using the text. For example, in the case where the first language component candidate $E_{1i}(k)$ (="Bistro OO") is stored in the first slot and no candidate is stored in the second slot in the first utterance processing unit 110 corresponding to the meal domain, the utterance text for inquiry: "What do you want to know about Bistro OO?" is generated. Further, in the case where no candidate is stored in the first slot and the second language component candidate $E_{2j}(k)$ (="address") is stored in the second slot in the first utterance processing unit 110 corresponding to the meal domain, the utterance text for inquiry: "Which address do you want to know?" or "Please say it again." is generated.

If the domain selection unit 104 determines that the selected domain is the third domain (chat domain) (NO in S020 in FIG. 2), the utterance generation unit 124 of the second utterance processing unit 120 corresponding to the third domain uses the keyword detected by the keyword detection unit 122, the knowledge for chat generation, and the text retrieved from the Internet as necessary, to generate an utterance text for chat (S033 in FIG. 3). In the case where there are a plurality of third domains, an utterance text directly inquiring of the user about an appropriate domain for use in the conversation with the user, such as "Which information do you want?", may be generated, for selecting one of the plurality of third domains.

Subsequently, the utterance generation unit 113 of the first utterance processing unit 110 or the utterance generation unit 124 of the second utterance processing unit 120 outputs the utterance text to the utterance selection unit 132. Further, the utterance selection unit 132 outputs the input utterance text to the speech synthesis unit 134, which in turn causes the input utterance text to be output from the speaker in the form of speech (S034 in FIG. 3). As a result, the speech "The address of Bistro OO is XX-ku, Kyoto-city, Kyoto-prefecture" is output from the speaker.

The conversation system 100 determines whether the conversation with the user is finished (S036 in FIG. 3). For example, in the case where the ignition switch of the automobile on which the conversation system 100 is mounted is switched from ON to OFF, it is determined that the conversation is finished. On the other hand, if it is determined that the conversation between the conversation system 100 and the user is ongoing (NO in S036 in FIG. 3), the index k representing the accumulated number of user's utterances is incremented by 1 (S038 in FIG. 3), and the series of processing following the above-described first speech recognition (see S002 in FIG. 2) and the second speech recognition (see S003 in FIG. 2) is carried out.

The following is an example of conversation between the user and the conversation system 100 according to the above-described processing. U represents the user's utterance, and S represents the utterance of the conversation system 100.

CONVERSATION EXAMPLE $U_1$: Tell me the address of Bistro OO.
$S_1$: The address of Bistro OO is XX-ku, Kyoto-city, Kyoto-prefecture.
$U_2$: Tell me the contact number of Bistro OO.
$S_2$: The contact number of Hotel OO is . . . .
$U_3$: The contact number of Bistro OO.
$S_3$: Do you want information about a hotel?
$U_4$: No.
$S_4$: Do you want information about a restaurant?

The first system utterance $S_1$ is the utterance output after the first user utterance $U_1$ was recognized accurately and the "meal domain" appropriate as the domain for use in conversation with the user was selected. The second system utterance $S_2$ is the utterance output after the second user utterance $U_2$ was not recognized accurately and the "accommodation domain" as the first domain with the highest likelihood was selected rather than the "meal domain" as the second domain (domain selected at the first time). The third user utterance $U_3$ is repetition of the second user utterance $U_2$, because the "accommodation domain" selected at the second time is inappropriate as the domain for use in conversation. The third system utterance $S_3$ is the utterance output after the third user utterance $U_3$ was not recognized accurately again, and the "accommodation domain" as the second domain (domain selected at the second time) was selected. Since the domain selected at the third time, i.e. the "accommodation domain", is still inappropriate as the domain for use in conversation, the fourth user utterance $U_4$ is a negative response. The fourth system utterance $S_4$ is the utterance output after the negative response as the fourth user utterance $U_4$ was recognized accurately and the "meal domain" as the third domain was selected rather than the "accommodation domain" as the second domain (domain selected at the third time).

According to the conversation system 100 exerting the above-described functions, at least one "first domain" among a plurality of domains which satisfies the "first condition" concerning the current utterance understanding result is included in the choices for the current domain (see S010 in FIG. 2). This ensures that the domain having high reliability as the domain for use in conversation in consideration of the current utterance understanding result is selected as the current domain.

Further, at least one "second domain" among a plurality of domains which satisfies the "second condition" concerning the selection history is included in the choices for the current domain (see S014 in FIG. 2). This allows the domain having high reliability as the domain for use in conversation in consideration of the selection history to be selected as the current domain.

Furthermore, the current domain is selected based on the evaluation results of a part or all of the first, second, and third indices for each of the first and second domains (see S018 in FIG. 2). This ensures that the domain having high reliability as the domain for use in conversation in consideration of a part or all of the utterance understanding history, selection history, and utterance generation history is selected as the current domain.

Furthermore, in addition to the first and second domains, at least one "third domain" is included in the choices for the current domain. Accordingly, in the case where the first and second domains are both inappropriate as the current domain in consideration of the evaluation results of a part or all of the first, second, and third indices, the third domain, rather than the first or second domain, may be selected as the current domain.

Accordingly, it is possible to advance the conversation with the user with improved capability of following the contents of the user's utterances. Experiments carried out by the inventors have confirmed that while the accuracy in selecting a domain (=(the number of times a correct domain was selected)/(the accumulated number of times the domains were selected)) by the conventional conversation system was 68.9%, the accuracy in selecting a domain by the inventive conversation system was 74.0%, with the accuracy improved by 5.1%.

The invention claimed is:

1. A conversation system comprising:
a speech input device and a speech output device;
an utterance understanding unit adapted to understand an utterance to be inputted into the speech input device;
a conversation state storage unit adapted to store an utterance understanding result as understood by the utterance understanding unit;
a domain selection unit adapted to select one of a first domain and a second domain based on the utterance understanding result as understood by the utterance understanding unit;
a first utterance generation unit adapted to generate an utterance to be outputted based on the utterance understanding result stored in the conversation state storage unit, the utterance to be outputted from the speech output device being based on one of the first and second domains selected by the domain selection unit; and
a database for storing a plurality of texts;
the conversion state storage unit comprising a plurality of slots,
each of the plurality of slots being adapted to store each of a plurality of language component candidates, and each of the language component candidates being stored is retrieved from each set of the language component candidates based on a likelihood with regard to each language component included in the utterance inputted into the speech input device,
wherein the first utterance generating unit is adapted to retrieve a specific text from the database and to generate the utterance to be outputted using the text that has been retrieved when all of the slots are in a stored state, while the first utterance generating unit generates the utterance to be outputted using the language component candidate stored in a portion of the slots, when only the portion of the slots is in the stored state, wherein the domain selection unit is adapted:
to specify the first domain satisfying a first condition concerning a current utterance understanding result by the utterance understanding unit, and to specify the second domain satisfying a second condition concerning a selection history by the domain selection unit from among the first and second domains,
to evaluate a part or all of first, second, and third indices for each of the first and second domains, the first index representing a reliability in consideration of an utterance understanding history by the utterance understanding unit, the second index representing a reliability in consideration of the selection history by the domain selection unit, and the third index representing a reliability in consideration of an utterance generation history by the first utterance generation unit, and
to select one of the first domain, the second domain, and a third domain different from the first and second domains, as a current domain, based on the evaluation results and according to a selection rule,
the system further comprising:
a second utterance generation unit adapted to generate a different utterance to be output from the speech output device,
wherein when the domain selection unit has determined that the third domain satisfying a third condition that is different from either the first condition or the second condition has a second attribute, the utterance to be outputted from the speech output device is generated by the second utterance generation unit instead of the being generated by the first utterance generation unit.

2. The conversation system according to claim 1, wherein the domain selection unit evaluates the likelihood of each of the domains based on the utterance understanding result by the utterance understanding unit, and specifies a specific one of the domains satisfying the first condition that the likelihood of the specific one of the domains is ranked within n 1 (n 1=1, 2, ... ), as the first domain.

3. The conversation system according to claim 1, wherein in selecting a domain at the k+1-th time (k=1, 2, ... ), the domain selection unit specifies a specific one of the domains satisfying the second condition that the specific one of the domains was selected as the current domain up to i times before (i=1, 2, ... ), as the second domain.

4. The conversation system according to claim 1, wherein in selecting a domain at the k+1-th time (k=1, 2, ... ), the domain selection unit specifies a specific one of the domains satisfying the second condition that an accumulated number of times that the specific one of the domains was selected as the current domain is ranked within n 2 (n 2=1, 2, ... ) among the specific one of the domains that were selected as the current domain up to i times before, as the second domain.

5. The conversation system according to claim 1, wherein the domain selection unit evaluates the first index for each of the first and second domains, based on at least one of:
an index representing a presence/absence of a positive response;
an index representing a presence/absence of a negative response;
a number of times the slots have been updated;
an accumulated number of positive responses;
an accumulated number of negative responses;
an accumulated number of times of the slots have been updated;
a number of times that the utterance has been understood;
an acoustic score of the utterance understanding result;
a posterior probability of the utterance understanding result; and
an arithmetic mean of language component reliability in the utterance understanding result.

6. The conversation system according to claim 1, wherein the domain selection unit is adapted to evaluate the second index for each of the first and second domains, based on at least one of an index representing presence/absence of selection, and a number of times of the selection.

7. The conversation system according to claim 1, wherein the domain selection unit is adapted to evaluate the third index for each of the first and second domains, based on at least one of an index representing presence/absence of a task accomplishment, and an accumulated number of times of the task accomplishment.

8. The conversation system according to claim 1, wherein the domain selection unit is adapted to select the current domain according to a decision tree serving as a selection rule.

9. The conversation system according to claim 1, wherein the third domain is a chat domain.

10. A conversation program embodied on a non-transitory computer readable medium and configured to cause a computer to function as a conversation system, the conversation system comprising:
a speech input device and a speech output device;
an utterance understanding unit adapted to understand an utterance to be inputted into the speech input device;
a conversation state storage unit adapted to store an utterance understanding result as understood by the utterance understanding unit,
a domain selection unit adapted to select one of a first domain or a second domain based on the utterance understanding result as understood by the utterance understanding unit;
a first utterance generation unit adapted to generate an utterance to be outputted based on the result stored in the conversation state storage unit, the utterance to be outputted from a speech output device being based on one of the first and second domains selected by the domain selection unit; and
a database for storing a plurality of texts;
the conversion state storage unit comprising a plurality of slots,
each of the plurality of slots being adapted to store each of a plurality of language component candidates, and each of the language component candidates being stored is retrieved from each set of the language component candidates based on a likelihood with regard to each language component included in the utterance inputted into the speech input device,
wherein the first utterance generating unit is adapted to retrieve a specific text from the database and to generate the utterance to be outputted using the text that has been retrieved when all of the slots are in a stored state, while the first utterance generating unit generates the utterance to be outputted using the language component candidate stored in a portion of the slots, when only the portion of the slots is in the stored state,
the program causing the domain selection unit of the conversation system to perform steps, including:
specifying a first domain satisfying a first condition concerning a current utterance understanding result by the utterance understanding unit and a second domain satisfying a second condition concerning a selection history by the domain selection unit from among the first and second domains, evaluating a part or all of first, second, and third indices for each of the first and second domains, the first index representing a reliability in consideration of an utterance understanding history by the utterance understanding unit, the second index representing a reliability in consideration of the selection history by the domain selection unit, and the third index representing a reliability in consideration of an utterance generation history by the first utterance generation unit, and selecting one of the first domain, the second domain, and a third domain different from the first and second domains, as a current domain, based on the evaluation results and according to a selection rule, wherein the computer of the conversation system further comprises:

a second utterance generation unit adapted to generate a different utterance to be output from the speech output device, and the program further causing the domain selection unit of the conversation system to perform steps, including:

determining that the third domain satisfies a third condition that is different from either the first condition or the second condition, and causing the second utterance generation unit, rather than the third processing unit, to generate the utterance to be outputted from the speech output device.

* * * * *